(No Model.)
Z. T. SWEENEY.
Mold for the Formation of Ice.
No. 236,647.                     Patented Jan. 11, 1881.
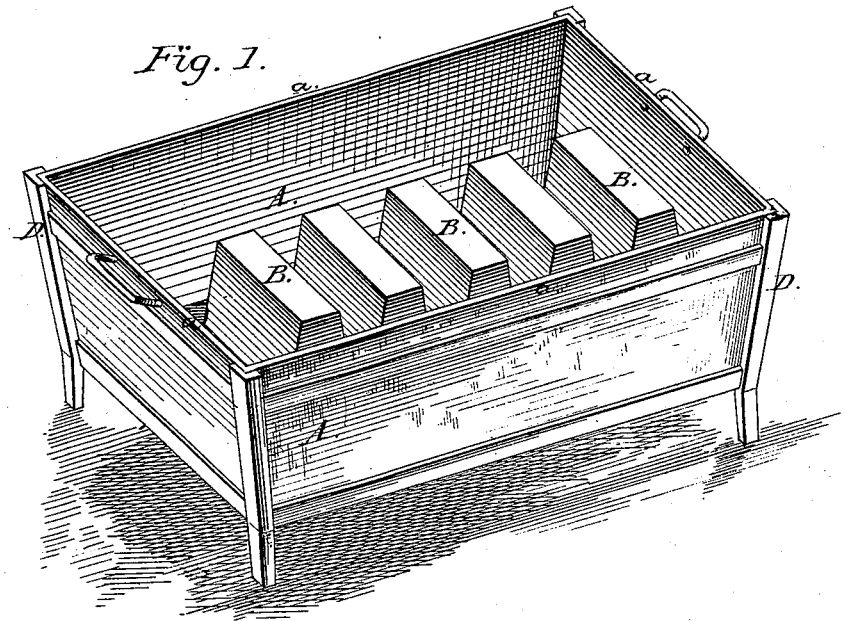
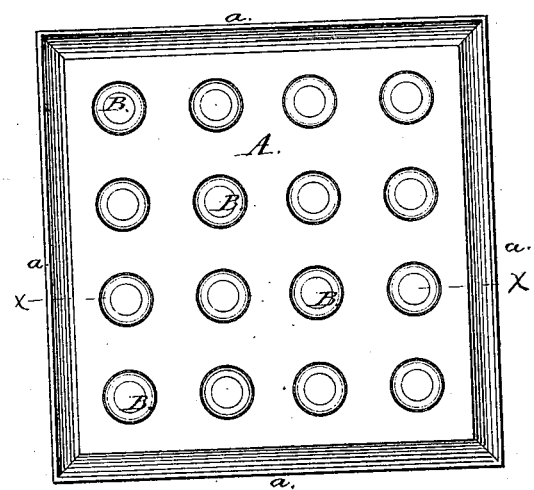
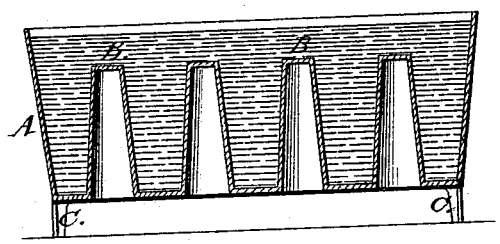
Witnesses:
Inventor:

UNITED STATES PATENT OFFICE.

ZACHARY T. SWEENEY, OF COLUMBUS, INDIANA.

MOLD FOR THE FORMATION OF ICE.

SPECIFICATION forming part of Letters Patent No. 236,647, dated January 11, 1881.

Application filed November 20, 1880. (No model.)

*To all whom it may concern:*

Be it known that I, ZACHARY T. SWEENEY, of Columbus, in the county of Bartholomew and State of Indiana, have invented certain new and useful Improvements in Molds for the Natural or Artificial Formation of Ice; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in devices to assist in the natural or artificial formation of ice.

It consists in providing a vessel, cup-shaped, to hold water, which has, rising from its base or bottom within, a series of hollow tubes open at the bottom and closed at the top, and being somewhat shorter than the sides of the vessel, to form a mold, which, when filled under the influence of a freezing atmosphere, will produce a block of ice filled or pierced with cells capable of holding water to be afterward frozen.

In my drawings, Figure 1 is a perspective view, showing one form of vessel. Fig. 2 is a plan view of a third example of my principle. Fig. 3 is a section on line $xx$ of Fig. 3.

Referring to drawings, A is a vessel, preferably of metal, rectangular in general form, mounted upon legs C, with its sides flaring or widening from the base to the top. Within the said vessel are fixed, at its bottom, a series of tubes, B, which are circular in sectional form, tapering inward from the bottom of the vessel upward and closed at the top. These tubes are hollow and open at their bottoms to admit and retain air. They are closed at their tops and are somewhat shorter than the sides of the vessel, so that when the vessel is filled with water they will be entirely covered. These tubes B may be circular, elliptical, or rectangular in sectional form, and their walls may be vertical or tapering upward toward their axial lines.

In the use of my molds I fill the cup or interior of the vessel with water and expose it to the atmosphere to be frozen.

By the peculiar formation of my vessel I expose a large surface to the action of the atmosphere, which will cause a rapid congelation of the water from all sides, so that in a very short time, in a freezing atmosphere, a block of ice will be formed, which, when taken from the mold, will present the appearance of a cellular block. By inverting said block and filling said cells with water and again exposing it to the freezing atmosphere a solid block will be completed ready for immediate use or storage.

The cells may be filled with water of a different color and frozen, when the block will present a very beautiful appearance.

When the tubes B are cylindrical in form the unfinished block may be eased from its mold after immersion in warm water, whereas when conical tubes are used the said block will draw easily and readily.

The sides $a$ of the vessel may also be flaring outward, to facilitate a free withdrawal of the ice, or vertical, as preferred.

It is well known that in the formation of ice a rapid expansion takes place, so that, unless provided against, the sides of the vessel would be thrown outward, and said vessel might probably be rent asunder; and in order to guard against this I provide a skeleton metallic case strongly constructed and provided with legs, as shown, into which I set the vessel A, it being so arranged as to form no obstruction to the easy insertion of said vessel into it.

In my drawings I have shown the tubes B in three (3) forms—viz., conical, rectangular, and oblong and circular; but I do not wish to be confined to their special shapes, as they may be of the form in section of any polygon.

I am aware that devices having conical tubes let into the body of the water from above have been known in the formation of ice, and also reservoirs for freezing divided into apartments which have tubes in them closed at the bottom and extending above the surface of the water above, and I do not claim such; but What I do claim is—

A vessel for forming ice, composed of a cup-shaped mold having hollow tubes rising from the bottom of said mold, open at their bottoms and closed at their tops, and being somewhat shorter than the sides of said mold, substantially as and for the purpose set forth.

In testimony that I claim the foregoing as my own I affix my signature in presence of two witnesses.

Z. T. SWEENEY.

Witnesses:
    JOHN C. BREWER,
    FRED. T. LOCKHART.